UNITED STATES PATENT OFFICE 2,467,222

PROCESS FOR MAKING THIOLS

Albert Alan Pavlic, Claymont, Del., assignor to E. I. du Pont de Nemours & Company, Wilmington, Del., a corporation of Delaware No Drawing. Application February 27, 1946, Serial No. 650,756

3 Claims. (Cl. 260—609)

This invention relates to hydrogenation processes, and more particularly to the production of thiols by said processes.

For many years thiols and many other compounds containing one or more thiol groups have been recognized as important classes of organic intermediates having a wide variety of potential uses in industry. Nevertheless the development and commercial utilization of simple and substituted thiols has been seriously hindered, except in a few isolated cases, either by lack of suitable low cost raw materials or by the unavailability of practical methods for manufacture. It has been proposed, for example, to produce aliphatic thiols by the interaction of organic halogen compounds and sodium hydrosulfide or sodium thiosulfate. Although in several instances, particularly in the synthesis of primary thiols, this method gives good results, its commercial scope has been limited both by the high cost and relative scarcity of suitable halogen compounds. The literature also contains disclosures of a method for the synthesis of aliphatic thiols involving addition of hydrogen sulfide to ethylenic compounds. This process is also limited in scope and performance. Aromatic thiols have been made by the reduction of the corresponding sulfonyl compounds, but this method is complicated by purification difficulties. Hence, the discovery and provision of a method for the synthesis of thiols from potentially low cost, readily available raw materials comprises an important and valuable advance in the field of sulfur chemistry.

It is accordingly an object of this invention to provide a new and improved process for the production of thiols. Another object is a process for producing thiols from carboxylic acid diesters of certain 1,1-diols. Still another object is to provide a new and improved catalytic process for the production of thiols from diesters of 1,1-glycols. Other objects will be apparent from the following description.

The above objects are accomplished by the following invention which comprises reacting hydrogen with a carboxylic acid diester of a 1,1-diol more particularly defined hereinafter under pressure at a temperature in excess of 50° C. but below 250° C. in the presence of a sulfactive hydrogenation catalyst and hydrogen sulfide or a substance which, under the conditions of reaction, produces hydrogen sulfide.

The exact manner of practicing this invention will vary somewhat with the particular carboxylic acid diester processed but the following procedure in which the 1,1-diol is referred to as a 1,1-alkanediol, will illustrate its application in a general way.

A reactor is charged with the desired carboxylic acid diester of a 1,1-alkanediol and an equal weight of methanol as a solvent. To this charge is added about 1%, by weight of the carboxylic acid diester, of a sulfactive hydrogenation catalyst, and hydrogen sulfide or sulfur in an amount sufficient to provide at least 1 mol of hydrogen sulfide per mole of the carboxylic acid diester. The reactor is closed, placed on an agitating rack and pressured with hydrogen to at least 100 lb./sq. in. and the reaction mixture heated to a temperature in the range of 50 to 250° C. After reaction has ceased the reactor is cooled, opened, and the contents discharged and filtered to remove the catalyst. The reaction product is separated from the methanol by distillation or by other means known to the art.

The following examples are illustrative of methods for practicing the invention. Unless otherwise stated, parts are by weight.

Example I

Fifty parts of hexahydrobenzylidene diacetate, 80 parts of methanol, 5 parts of cobalt trisulfide catalyst and 30 parts of hydrogen sulfide are charged into a stainless steel agitated reactor and pressured to 2000 lb./sq. in. with hydrogen. The contents are heated to 125° C. for 2 hours with addition of hydrogen to replace that consumed in the reaction. The resulting solution is filtered to remove the catalyst and the product is distilled as follows:

1. 53–66° C./760 mm.—Solvent removal
2. 66–179° C./760 mm.—Solvent, water and acetic acid
3. 179–182° C./760 mm.—18 parts
4. 50–56° C./1 mm.—5.2 parts
5. Residue—7.8 parts Cut 3 is shown by analysis and the preparation of suitable derivatives to be hexahydrobenzylthiol, in 50% yield. Cut 4 is hexahydrobenzylthioacetate (13% yield) resulting from the esterification of the thiol by the liberated acetic acid. The free thiol can be obtained by hydrogen chloride-catalyzed methanolysis of the ester.

Example II

Fifty parts of hexahydrobenzylidene diacetate, 80 parts of methanol, 5 parts of cobalt trisulfide catalyst and 20 parts of sulfur are charged into a stainless steel agitated reactor and pressured to 2000 lbs./sq. in. with hydrogen. The contents are heated to 135–140° C. for 4 hours with additions of hydrogen when needed, a total of about 1000 lbs./in.$^2$ of hydrogen being consumed during this time. The resulting solution is filtered to remove the catalyst and the methanol is removed by distillation. The product is co-distilled with water over the range 120–172° C. at normal pressure. The 29.6 parts two-phase system obtained is separated and the organic layer, 21.1 parts, is dried over anhydrous Na$_2$SO$_4$. Analysis of this product indicates that 97 per cent of it is hexahydrobenzylthiol.

The above examples serve to illustrate the best method now known for practising the invention. The starting materials and the conditions of temperature, catalyst, reaction time, etc., are, however, subject of considerable variation within the scope of the invention.

The reaction between the carboxylic acid diester of the 1,1-diol and the hydrogen sulfide in the presence of hydrogen is promoted by the known sulfactive catalysts. Generally, the heavy metal sulfides are suitable, especially those comprising the sulfides and polysulfides of the metals of groups VI and VIII of the periodic table. Examples of catalyst compositions which are particularly efficient are the sulfides of cobalt, nickel, iron, molybdenum, tungsten and chromium. Suitable catalysts can be prepared by precipitation methods in which a soluble salt of a metal, such as cobalt, is treated with a solution of sodium or ammonium polysulfide; particularly active catalysts are obtained by treating a pyrophoric hydrogenting metal with a sulfiding agent such as hydrogen sulfide, sulfur, or organic compounds of bivalent sulfur at moderate temperatures. The latter process may be carried out conveniently in situ by charging the reactor with the free metal together with the alkylidene diester and hydrogen sulfide or a substance capable of generating hydrogen sulfide under the conditions of reaction. The hydrogen sulfide will react with the pyrophoric metal to form a sulfactive catalyst.

In place of the metal sulfides mentioned above there can be used ruthenium, either in the form of the finely divided free metal or in the form of its oxide or salt. The ruthenium catalyst may be supported on a carrier such as charcoal, silica gel, alumina, etc. A suitable method for preparing a charcoal-supported ruthenium catalyst consists in fusing ruthenium or its oxide with sodium peroxide, dissolving the salt, pouring the resulting solution over charcoal and drying the impregnated charcoal. Other methods, however, can be used, such as that of U. S. Patent 2,079,404, or other procedures based on the reduction of a compound of ruthenium in the presence of a carrier substance.

The amount of catalyst used depends upon its activity. In general an amount is used sufficient to bring about reaction at a suitable rate under the temperature and pressure conditions employed. Usually, the amount will vary from about 1% to 15% by weight of the carboxylic acid diester of a 1,1-diol. Generally, an amount of catalyst is employed which is within the range of 5–12% on the weight of the carboxylic acid diester of a 1,1-diol.

In general, the process of this invention is operable at temperatures in the range of 50–250° C. It is generally preferred to operate, however, at temperatures in the range of 75–150° C.

The conversion of the carboxylic acid diesters of 1,1-alkanediols to thiols is desirably carried out in the presence of an organic solvent and examples of such solvents are saturated hydrocarbons such as petroleum ether and aromatic hydrocarbons such as benzene. Other solvents that may be employed are ethers, such as diethyl ether and dioxane, alcohols such as methanol, ethanol, and butanol, etc.

For best results pressures which are in excess of 100 lb./sq. in. and generally in excess of 300 lb./sq. in. are used since under these conditions satisfactory reaction rates are obtained. The upper pressure limit, however, is determined by the structural limitations of the equipment employed.

The reaction is carried out in the presence of hydrogen sulfide or a substance which, under the conditions of reaction, yields hydrogen sulfide. Examples of such materials are sulfur, carbon disulfide, etc.

In place of the specific carboxylic acid diesters of the 1,1-diols mentioned in the examples there may be used other diesters of the general formula

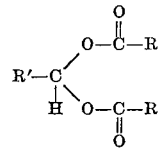

wherein R and R' are hydrocarbon radicals of the class of aliphatic, aromatic and cycloaliphatic. Specific examples of compounds operable in the practice of this invention are methylene, ethylidene, propylidene, isopropylidene and dodecylidene diacetates, dipropionates, and dibenzoates; benzylidene diacetate, dipropionate, etc.; or cyclic esters such as ethylidene succinate or hexahydrobenzylidene phthalate.

The process of this invention can be operated as a liquid or vapor phase batch, semi-continuous, or continuous operation.

As many apparently widely different embodiments of this invention may be made without departing from the spirit and scope thereof, it is to be understood that I do not limit myself to the specific embodiments thereof except as defined in the appended claims.

I claim:

1. A process for obtaining thiols which comprises heating at a temperature of from 50° C. to 250° C. and under superatmospheric pressure a carboxylic acid ester of a 1,1-alkane diol and hydrogen in contact with a sulfactive hydrogenation catalyst and with a substance selected from the group consisting of hydrogen sulfide and materials which when heated under the conditions of the reaction produce hydrogen sulfide.

2. A process for obtaining thiols which comprises heating at a temperature of from 50° C. to 250° C. and under superatmospheric pressure a carboxylic acid ester of a 1,1-diol and hydrogen in contact with a sulfactive hydrogenation catalyst and with a substance selected from the group consisting of hydrogen sulfide and materials which when heated under the conditions of the reaction produce hydrogen sulfide, said ester being of the formula

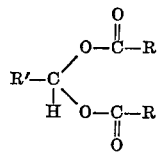

wherein R and R' are hydrocarbon radicals.

3. A process for obtaining hexahydrobenzylthiol which comprises heating at a temperature of from 50° C. to 250° C. and under superatmospheric pressure hexahydrobenzylidene diacetate and hydrogen in contact with a sulfactive hydrogenation catalyst and with a substance selected from the group consisting of hydrogen sulfide and material which when heated under the conditions of the reaction produce hydrogen sulfide.

ALBERT ALAN PAVLIC.

REFERENCES CITED

The following references are of record in the file of this patent:

UNITED STATES PATENTS

| Number | Name | Date |
| --- | --- | --- |
| 2,020,421 | Lee | Nov. 12, 1935 |
| 2,070,761 | Von Szeszich | Feb. 16, 1937 |
| 2,393,740 | Brant et al. | Jan. 29, 1946 |